(12) United States Patent
Schnabel

(10) Patent No.: US 7,184,744 B1
(45) Date of Patent: Feb. 27, 2007

(54) GPS ENABLED EMERGENCY MESSAGING SYSTEM

(75) Inventor: Jon William Schnabel, Nutley, NJ (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 474 days.

(21) Appl. No.: 10/268,096

(22) Filed: Oct. 10, 2002

(51) Int. Cl.
*H04M 11/04* (2006.01)

(52) U.S. Cl. ............... 455/404.2; 455/456.6; 455/456.5; 342/357.09; 342/357.03; 340/539.13

(58) Field of Classification Search ............ 455/456.6, 455/456.5, 404.2; 340/539.13, 905; 705/7; 702/5; 345/140, 130; 342/357.09, 357.03
See application file for complete search history.

(56) References Cited

U.S. PATENT DOCUMENTS

| | | | |
|---|---|---|---|
| 6,608,559 B1* | 8/2003 | Lemelson et al. | 340/539.13 |
| 6,640,187 B1* | 10/2003 | Chenault et al. | 701/209 |
| 6,956,891 B2* | 10/2005 | Tan | 375/140 |
| 2002/0150068 A1* | 10/2002 | Orr et al. | 370/335 |
| 2003/0212494 A1* | 11/2003 | Alexander et al. | 702/5 |
| 2004/0014478 A1* | 1/2004 | Hoffman et al. | 455/456.1 |
| 2004/0044553 A1* | 3/2004 | Lambert et al. | 705/7 |
| 2004/0142659 A1* | 7/2004 | Oesterling | 455/11.1 |
| 2004/0198449 A1* | 10/2004 | Forrester et al. | 455/561 |
| 2005/0137786 A1* | 6/2005 | Breed et al. | 701/200 |

OTHER PUBLICATIONS

Tomasz Imielinski, et al.; Geographic Addressing, Routing, and Resource Discovery with the Global Positioning System; Oct. 19, 1996; pp. 1-11.
Peter Broadwell, et al.; GeoMote: Geographic Multicast for Networked Sensors; pp. 1-12.
Gene L. Cangiani, et al.; Methods and Apparatus for Generating a Constant-Envelope Composite Transmission Signal; U.S. Appl. No. 09/963,669; filed Sep. 21, 2001.

* cited by examiner

*Primary Examiner*—Danh Cong Le
(74) *Attorney, Agent, or Firm*—Edell, Shapiro & Finnan, LLC

(57) ABSTRACT

A GPS enabled Emergency Messaging System (GEMS) includes: Emergency Response Centers (ERC's) for defining emergency broadcast messages directed to specified geographic areas; a GPS Control Segment (CS) facility that receives messages generated by the ERC's and coordinates uplink and downlink communications with orbiting GPS satellites; a GPS Space Segment (SS) that includes the multiple orbiting GPS satellites and that receives emergency messages from the CS facility and broadcasts transmissions containing both GPS navigational information and an emergency broadcast message; and GEMS-enabled user equipment that is capable of receiving and processing broadcast emergency messages. The system permits emergency messaging data to be superimposed on the existing GPS signal structure and delivered to users with GPS receivers capable of receiving the superimposed messaging data.

38 Claims, 10 Drawing Sheets

RECEPTION BY SPACE SEGMENT

GPS ENABLED EMERGENCY MESSAGING SYSTEM

BACKGROUND OF THE INVENTION

1. Field of Invention

The present invention relates to methods and apparatus for implementing a satellite-based emergency broadcast system and, more particularly, to methods and apparatus associated with an emergency broadcast system that is integrated with infrastructure and communications that support a satellite-based global positioning system.

2. Description of the Related Art

Global Positioning System (GPS) satellite navigation as exemplified by NAVSTAR/GPS, is an accurate, three-dimensional navigation system that has become one of the most important technologies of the era, impacting a myriad of users from aircraft and ships, to farmers and hikers. The GPS comprises a constellation of twenty-eight active satellites that orbit the earth twice each day. The orbits of the GPS satellites are maintained in a virtually circular manner at approximately 10,898 nautical miles above the earth, the GPS satellites orbit the earth in six overlapping orbital planes based on the equatorial plane of the earth. Although the number of satellites and number of planes in the GPS constellation may change in the future, as the design of the GPS system evolves, GPS satellite orbits are chosen so that the GPS system can provide information to users regardless of the time that the user needs information and regardless of the user's position on the earth's surface. This information contains a navigation message that includes satellite position and satellite clock drift information.

In order for the system to operate properly, the orbits of the GPS satellites are maintained by the GPS Control Segment which uses a global network of ground-based tracking stations and uplink antennas. The ground-based tracking stations each use a GPS L-band receiver to monitor the orbits of the GPS satellites. Each GPS satellite continuously broadcasts pseudo-random codes at L-band frequencies, L1 at 1575.42 MHz and L2 at 1227.6 MHz. One of these signals is referred to as a coarse acquisition (C/A) code, which is a signal that can be received by civilian-type GPS receivers. The other signal is referred to as a precision (P) code, which is a signal that can be received only by military-type GPS receivers. The ground stations on the earth receive these L-band transmissions from the satellites. These transmissions are analyzed by the GPS Control Segment which continuously estimates the precise orbital and clock drift parameters for each of the satellites in the constellation. Updated estimates for these parameters are then uplinked to the satellites by the Control Segment using a global network of uplink ground antennas. Each satellite then updates the orbital and clock data it transmits to the GPS users.

A major benefit of the GPS is that the number of users is unlimited, because the signals transmitted by the satellites are passively acquired. Thus, broad civilian and commercial applications are possible. For example, GPS navigation is commonly applied in terrestrial (earth) based applications. In such applications, a GPS receiver is located in mobile units, such as ground vehicles, to enable the vehicle operators to precisely locate their respective global positions. GPS navigation has also been proven to be of value for aircraft and spacecraft use, with such "non-terrestrial" mobile units employing a GPS receiver for precisely locating the unit's global position.

The user's GPS receiver operates by engaging in a radio-ranging calculation which involves acquiring the encoded signals transmitted by each GPS satellite and making pseudorange measurements. These measurements are processed in real time to provide the best estimate of the user's position (latitude, longitude, and altitude), velocity, and system time. The user's receiver maintains a time reference that is used to generate a replica of the codes transmitted by the satellite. The amount of time that the receiver must apply to correlate the replicated code with the satellite clock referenced code received from the satellite provides a measure of the signal propagation time between the satellite and the receiver. This time propagation or "pseudorange" measurement is a measure of the time synchronization error between the satellite and receiver clocks, and thus allows time to be precisely synchronized for position calculation purposes. The user's receiver then, employs a multi-dimensional equivalent of triangulation on the data received from the GPS satellites to compute the user's position. In order to use this "trilateration" technique, four of the orbiting GPS satellites generally must be visible (i.e., within line of sight) to the user at any one time, and the position of these four satellites relative to the earth must be known.

In light of the recent increase in terrorist activities, in addition to the inevitability that other disaster situations, whether man-made or natural, will occur in the future, it is of the utmost importance to establish multiple mechanisms by which emergency response organizations can disseminate information quickly and to as broad an audience as possible within an area affected by an emergency. This capability could mean the difference between life and death for many people. Such systems already exist to some extent. The United States, for example, has an Emergency Broadcast System EBS that is used to broadcast messages via public and commercially-owned radio and television transmitters in the case of an emergency. Other countries have similar systems.

One shortcoming associated with existing emergency broadcast systems is that persons who are not within close proximity to a television or radio in active use when an alert is issued may not receive the alert. A further shortcoming is that these systems are effective only in geographic areas covered by commercial television and radio broadcast infrastructures, which could be damaged or disabled in emergency situations. Yet another shortcoming is the lack of an ability to geographically control emergency message dissemination. For example, certain evacuation instructions may need to be given to people located in one geographic area, while different evacuation instructions may need to be given to people located in another geographic area.

The number of new and useful applications for GPS has steadily increased in recent years. Such uses include position location of cellular phones for emergency response (the E911 standard), car navigation systems, GPS receivers as "worn" devices such as GPS enabled wrist watches, etc. All these devices contain various types of imbedded GPS receivers. The fact that such devices are more likely than a radio or TV to be turned on, operating, and constantly within reach of people, make such devices ideal candidates for receiving emergency notification data and alerting the owner.

Accordingly, there is a need for an emergency message distribution system capable of delivering emergency messages and information on a national and global basis, yet that is also capable of delivering highly specific emergency messages to relatively small geographic target locations. The emergency message development, coordination and broadcast approach would preferably be compatible with and leverage off existing deployed infrastructure and capable of deployment without extensive capital investment or significant increases in long-term lifecycle costs. The associated reception technology should be capable of cost effective integration into a wide variety of existing hand-held and portable consumer products, thereby significantly extending the emergency message reception community and the likelihood of rapid dissemination of emergency information.

SUMMARY OF THE INVENTION

Therefore, in light of the above, and for other reasons that become apparent when the invention is fully described, an object of the present invention is to enable distribution of emergency messages nationally and globally while minimizing investment in new infrastructure and long term maintenance costs.

Another object of the present invention is to deliver emergency messages tailored to the specific geographic location of the receiving device.

A further object of the present invention is to allow secure, decentralized control over the generation of geographically tailored emergency messages and message content.

Still another object of the present invention is to extend the existing emergency message system infrastructure with an alternative mechanism for delivering emergency messages and to assure the ability to disseminate emergency messages despite severe damage and/or destruction of ground-based radio and television infrastructure.

Yet a further object of the present invention is to enable delivery of emergency messages and information to individuals who are not within close proximity to an operating television or radio (i.e., devices supported by the existing emergency message system).

A still further object of the present invention is to reduce cost and complexity of emergency message system capable devices and thereby maximize opportunities for integrating emergency message reception into a wide variety of commercial electronic products.

The aforesaid objects are achieved individually and in combination, and it is not intended that the present invention be construed as requiring two or more of the objects to be combined unless expressly required by the claims attached hereto.

In accordance with the described methods and apparatus, the identified shortcomings of the present Emergency Broadcast Message Systems are overcome through use of the Global Positioning System (GPS) to disseminate geographically targeted emergency messages.

A GPS enabled Emergency Messaging System (GEMS) is described that includes: Emergency Response Centers (ERC's), set up at the city, county, state and/or national level for defining emergency broadcast messages directed to their respectively assigned geographic areas; a GPS Control Segment (CS) facility that receives messages generated by the ERC's and coordinates all uplink and downlink communications with orbiting GPS satellites; a GPS Space Segment (SS) that includes the multiple orbiting GPS satellites that receives emergency messages from the CS facility, and transmits a signal containing both GPS navigational information and an emergency broadcast message; and a set of user equipment that is capable of receiving and processing emergency messages, called GEMS-enabled user equipment. Modifications to conventional infrastructure are required to implement this system. These modifications, as well as operation of each of the components of this system, are described.

The methods, apparatus, and improvements described define a system that allows emergency messaging data to be superimposed on the existing GPS signal structure and delivered to users with GPS receivers capable of receiving the superimposed messaging data. Users of pre-existing GPS receivers that are not messaging capable are unaffected.

The GEMS signal contains both GPS navigational information and a scheduled emergency broadcast message. During the broadcast time period of an emergency message, the navigation payload superimposes a civilian emergency messaging channel on top of the existing GPS L1 navigation signal. The superimposed civilian emergency messaging channel contains the emergency message scheduled for that specific time period. One non-limiting, representative embodiment of a mechanism that can be used to superimpose a civilian emergency messaging channel on top of the existing L1 navigation signal is a technique known as inter-vote modulation. Emergency broadcast messages include geographic multicast addresses that allow GEMS-enabled receiver devices to selectively disregard emergency messages that are not directed the geographical area in which the receiver is located.

Using the methods and apparatus described, emergency messages can be distributed nationally and globally with minimal investment in new infrastructure and no increase in long-term maintenance costs via an existing deployed satellite constellation and associated support infrastructure. Messages are tailored to meet the needs of the user population based upon geographic area with no restrictions as to the granularity with which messages can be geographically addressed and no restrictions as to the varying sizes or degrees of overlap between the geographically addressed areas. This flexibility allows messages to be distributed in a controlled manner via a layered structure of overlapping hierarchies.

The described approach allows secure, decentralized control over the generation of geographically tailored emergency messages and message content by delegating responsibility for detailed message content to a distributed set of emergency response centers with knowledge of the affected areas. Given that the broadcast source is satellite based, messages can be delivered despite severe damage and/or destruction of ground-based radio and television infrastructure. Satellite-based distribution extends the coverage provided by the existing emergency message system infrastructure and provides an alternative, supplemental mechanism for delivering emergency messages, in addition to radio and television, via a wide variety of low-cost commercial electronic products.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION OF THE PREFERRED EMBODIMENTS

The following detailed explanation of the figures and of the preferred embodiments of the present invention reveal methods and apparatus for efficiently integrating an emergency message broadcast system capability within the presently deployed global positioning system (GPS) infrastructure.

Figure 1:
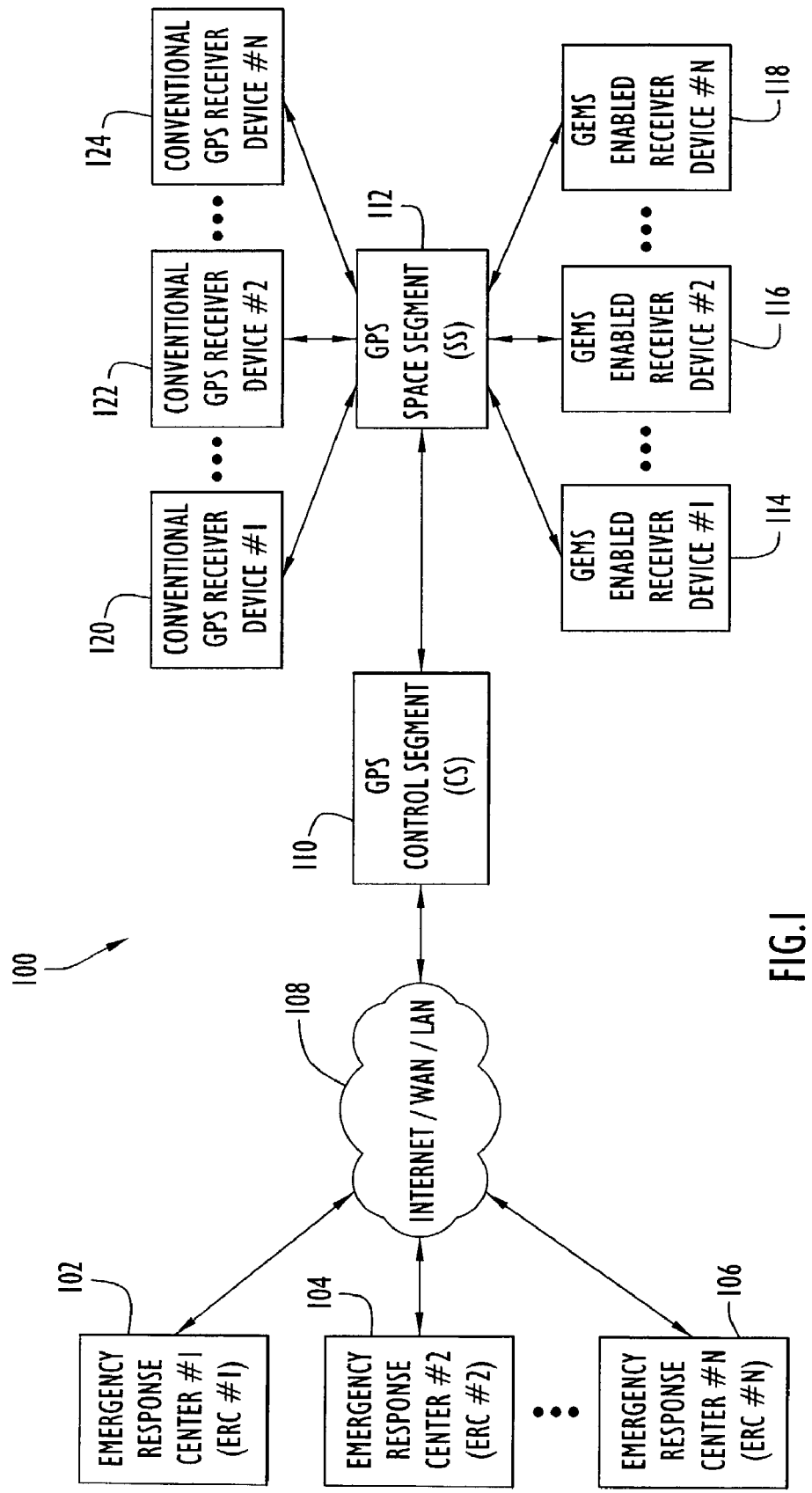
FIG. 1 is a system level diagram of a representative GPS based emergency message system in accordance with an exemplary embodiment of the present invention.

FIG. 1 is a non-limiting, representative system level diagram of a GPS enabled emergency message system (GEMS) environment in accordance with an exemplary embodiment of the present invention. The GEMS environment includes a plurality of emergency response centers (ERC's) (102, 104 and 106), each with a network connection 108 that can include multiple network components, including private local area network (LAN) segments, private wide area network (WAN) segments, and/or the Internet, by which emergency message requests, with broadcast request times and designated broadcast areas, are transmitted to a GPS ground-based control segment (CS) facility 110. The CS facility processes incoming emergency message requests, resolves broadcast request and satellite vehicle (satellite) resource conflicts and uplinks approved emergency broadcast messages to a constellation of orbiting GPS satellites referred to as the GPS space segment (SS) 112. Within each GPS satellite, an approved emergency message is combined with the GPS navigation message generated by the satellite into a single GPS signal that is broadcast to and received by GEMS-enabled receiver devices (114, 116 and 118) and conventional GPS receivers (120, 122, 124).

System Operation

Emergency response centers (ERC's) already exist throughout the United States as part of the established emergency response infrastructure. GEMS can be used to distribute emergency messages to locations within the United States, or to distribute emergency messages to international locations throughout the world. Given that the current GPS satellites and supporting infrastructure are owned and operated by the U.S. government, use of GEMS would also be U.S. government controlled; however, authority to submit emergency messages to a U.S. controlled CS facility for broadcast to a specific geographic area can be delegated to one or more authorized entities, such as foreign, state, and local government agencies.

Each ERC is equipped with a computer workstation (PC) running a GEMS software application. This application permits designation of various geographic regions within the jurisdiction of the ERC. In addition, the application allows the operator to enter emergency information and instruction messages. Each message is assigned to one or more of the defined geographic regions along with a broadcast time window (which can be set to any desired time duration).

Once a set of required messages and associated geographic regions are defined, the data is encrypted and sent to the GPS Control Segment (CS) via the Internet (or possibly some other government data network). The CS receives and decrypts the data and validates the authenticity of the message. Upon authentication, the CS checks that sufficient GPS system resources are available to handle the transmission of the requested message(s). If successfull, the CS uplinks the message data to the GPS constellation.

Preferably, the GPS constellation distributes the message data via GPS cross-links to the entire constellation. Each satellite maintains a database of messages (including geographic addresses) and transmit time windows as defined by the ERC's. When a message is to be transmitted, each satellite reconfigures the L1 signal of the satellite to enable the civilian emergency messaging channel and the message or messages begin to be transmitted back to the earth. These transmissions continue until they are either superceded by new messages, the message broadcast time window expires, or the message transmissions are terminated either by the ERC or the CS.

Any GEMS-enabled user equipment receiving an emergency message screens the message to determine if the message is being addressed to the geographic location of the user equipment. Any messages that are addressed to other geographic locations are discarded by the user equipment. Any messages addressed to the user equipment's location cause a user alert to be generated and the message is delivered to any aural or visual interface available to the GEMS-enabled user equipment. Thus, users with GEMS-capable devices are alerted with up-to-date information that pertains to their own particular geographic location.

In addition to, or in place of, filtering based upon geographic location, GEMS-enabled user equipment can also filter incoming messages using other criteria, such as based upon message priority. In one embodiment, the ERC includes a priority indicator within each message submitted to the CS facility. This priority indicator, for example, may be based upon a scale from zero to ten, in which a message assigned a priority of zero has little or no potential consequence to public safety if it is not received, while a message assigned a priority of ten has, potentially, a maximum significant impact to public safety if it is not received.

Using such a priority indicator approach, a test message, for example, used by the ERC to test the operational status of the GEMS system is assigned a low priority. On the other extreme, a message directed to the geographic area that represents a suburb of Oklahoma City, for example, informing the public that a large tornado is en-route would receive a very high priority.

To avoid being bothered with low priority messages, GEMS enabled user equipment is configured, by the user or by default, to ignore messages below a specified priority level. In this manner, a user is not bothered by low priority messages, yet will still receive messages assigned priority indicators above the established threshold. Should a user later desire to receive lower priority messages, the user equipment can be reconfigured to receive low priority messages and lower priority messages, such as test messages, are then received.

When emergency messages must be updated or turned off, ERC's generate these updates and transmit them to the CS. The CS authenticates the message updates, uplinks them to the constellation and messages are updated or turned off (deleted) as required.

The overall latency between the generation of messages at ERC's and reception of the alert by the end users are highly dependent upon capabilities provided during future upgrades of the GPS system. Latencies on the order of ten seconds or less can be achieved with high performance GPS system upgrades. Longer latencies on the order of several minutes to tens of minutes can be achieved with more modest upgrades.

Emergency Response Centers

Figure 2:
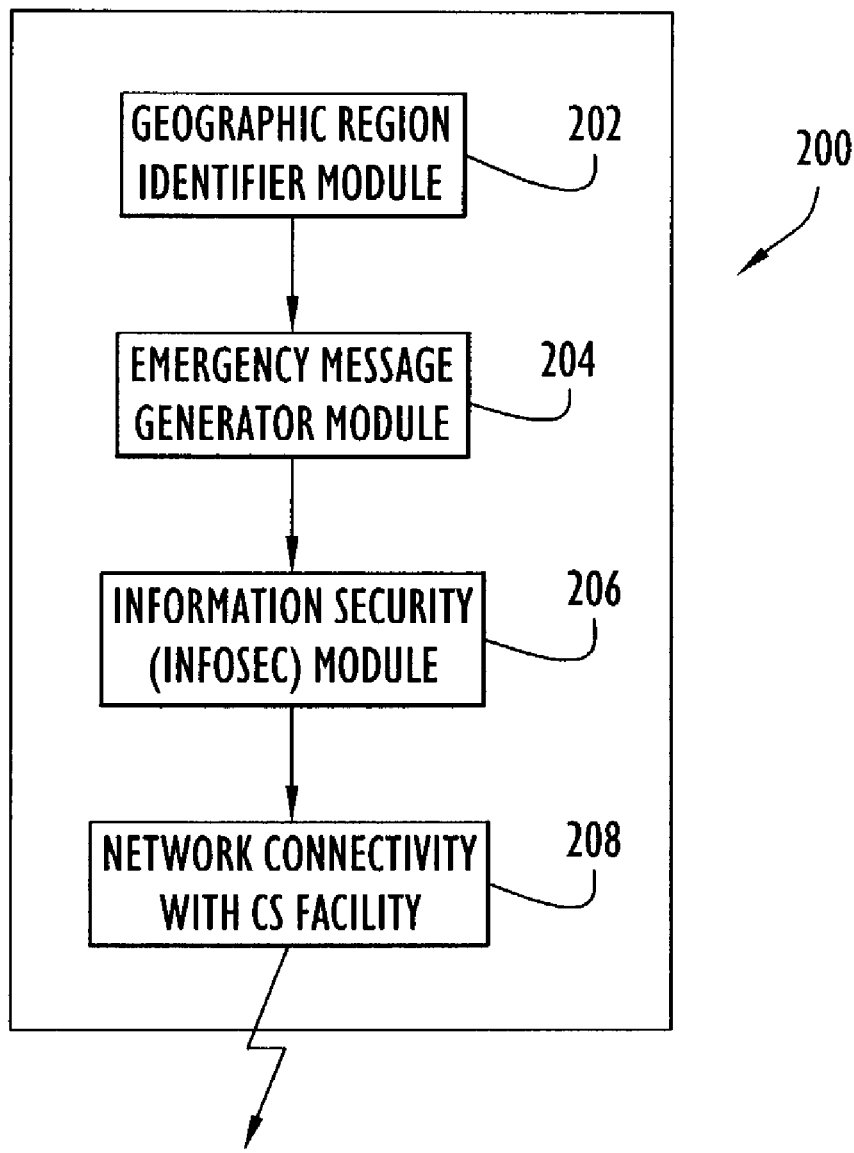
FIG. 2 is a system level diagram of a representative Emergency Response Center (ERC) in accordance with an exemplary embodiment of the present invention.

Each Emergency Response Center (ERC) participating in GEMS is equipped with a processor, such as a PC workstation, running a GEMS application. As depicted in FIG. 2, the key elements of an Emergency Response Center 200 are:

1. Geographic region identifier module 202;
2. Emergency message generator module 204;
3. Information Security (INFOSEC) module 206; and,
4. Network connectivity 208 with the Control Segment (CS) facility.

The geographic region identifier 202 is a software application that has the capability to define a geographic region of arbitrary shape and size and to assign a name to the defined geographic region. Once a region has been defined and named, the application generates a geographic multicast address (GMA) for the region, which is essentially a geographic identifier that indicates the geographic area in which reception of an emergency broadcast message is intended. The GMA is a string that defines the size, shape and geographic orientation of the geographic area in a compressed format.

There are many methods of defining the format of GMA's. One non-limiting, representative embodiment of the GMA is defined as a circle of radius R with a center at a particular latitude and longitude (Lat/Lon). In another non-limiting, representative embodiment the GMA is defined as a rectangle of length L and height H with one corner at a particular Lat/Lon. The GEMS methods and techniques described, however, are not limited to any specific GMA format. Any GMA format that allows a receiver to determine whether the receiver is a designated recipient of the message, based upon the receiver's geographic location, will suffice. To simplify receiver designs and to conserve bandwidth, one representative, non-limiting embodiment uses a standardized GMA format that is limited in size to a fixed, or user configurable, maximum number of bits. Multiple GMA formats can be used simultaneously, if necessary, to meet operational requirements; however, use of multiple GMA formats will increase the bit-length of a generated message, and hence increase uplink and downlink transmission time and increased message memory storage requirements within the satellite vehicle.

As described above, the geographic region identifier application has the capability to define a geographic region of arbitrary shape and size and to assign a name to the defined geographic region. The geographic region identifier application can be used to define physically isolated geographic areas or to define groups of multiple overlapping GMA's within in a single physical geographic region.

The ability to define groups of multiple overlapping GMA's within in a single physical geographic region is extremely useful in an emergency situation. For example, an emergency situation may arise that affects an entire metropolitan area (e.g., a city and the city's surrounding suburbs), and that requires evacuation of a large portion of the city. To respond to such a scenario, and in accordance with the methods and techniques described, the geographic region identifier application can be used to define multiple, separate geographic regions (or evacuation zones) within the evacuation area. Using the emergency message generator module 204, GEMS messages, specifically tailored for each of the evacuation zones, are generated and used to direct individuals within each of the evacuation zones to their respective evacuation route. An additional GMA that covers the entire metropolitan area (e.g., that encompasses all of the other evacuation zone GMA's, as well as the surrounding suburbs) is used to route general emergency information and instructions.

Flexibility in the definition of a GEMS message content, including the ability to define groups of multiple, overlapping GMA's within a single physical geographic region, may be extremely useful in other emergency situations as well. For example, an emergency situation may arise in which a child is abducted from an urban or rural location. Authorities are notified, and a GEMS message is prepared and transmitted to an identified geographic area within which the authorities are reasonably certain that the perpetrator/abductee(s) are located. In such a situation, a GEMS message may contain information useful in identifying the abductee(s), the perpetrator and other available information such as the license plate of the suspected abduction vehicle and a description of the situation. All GEMS-enabled users in the area would receive the alert, thus greatly improving the chances of a rapid, successful conclusion to the ordeal. In such a manner, the GEMS serves to extend the notification capabilities of the AMBER alert system that has been used successfully in recovering abducted children. Note that with sufficient civilian message channel bandwidth, the message could also include imbedded photographs (of abductees or suspects for example). For example, there are numerous wireless electronic devices (cell phones, etc.) available now and being developed with displays capable of handling photographic as well as text information. Designs for such equipment can be easily enhanced to allow future generations of such devices to become GEMS-enabled user equipment.

The ability to define and disseminate information and instructions to overlapping geographic areas conserves GEMS satellite transmission bandwidth, by allowing a message that encompasses multiple GMA's to be broadcast only once. Furthermore, such an approach saves satellite vehicle memory, since only a single message with a single GMA need be stored in a satellite pending transmission, rather than a single message with multiple GMA's, or multiple messages, each with a different GMA.

One embodiment of the GEMS geographic region identifier module 202 running at the ERC facility has the ability to generate a combined GMA from several previously defined GMA's. An operator need only identify one or more previously defined GMA regions and instruct the application program to generate a parent (or superset) GMA. The parent GMA can then be assigned to an emergency message and used to direct GEMS emergency messages, as described above.

The total length and number of messages that an ERC can generate can be limited based on traffic loading analyses of the entire GEMS system. As previously described, the GEMS satellites are constrained with respect to memory storage space and uplink and downlink bandwidth. Limits upon ERC's can be preset or dynamically controlled by the CS based upon overall system demand. The emergency message generator also provides the ability to update or deactivate existing messages as well as to define new GMA's and associated messages as the emergency scenario unfolds.

Once messages and their associated GMA's have been defined, the messages must be sent to the Control Segment (CS) facility for transmission to the GEMS satellite vehicles for broadcast. Prior to transmission to CS facility, the generated messages are passed to an Information Security (INFOSEC) module 206 where a digital signature is attached and the messages are encrypted. The digital signature provides a mechanism for the CS facility to authenticate any message received, that is, to verify that a message came from an authorized ERC. Encryption of emergency messages provides an added layer of security that enhances confidentiality and provides an additional mechanism that can be used to protect against spoofing by hostile parties in the event that the emergency message is transmitted over a non-secure network segment.

The GEMS methods and techniques described are not limited to any specific encryption algorithm, nor are security measures within GEMS limited to any single INFOSEC mechanism, such as message encryption or the use of digital signatures. Any combination of INFOSEC techniques can be used that are capable of meeting operational security requires within the target operational networked environment 208. For example, with respect to data encryption, algorithm selection is based upon the particular data network to be used to transfer GEMS information to the CS. For example, one set of algorithms might be required if the messages are to be transmitted via the Internet, but another set might be required if a private government network are to be used. In either case, the message, once suitably encrypted, is sent via a data network to the CS using, for example, a standardized network data transfer protocol such as TCP/IP.

Figure 3:
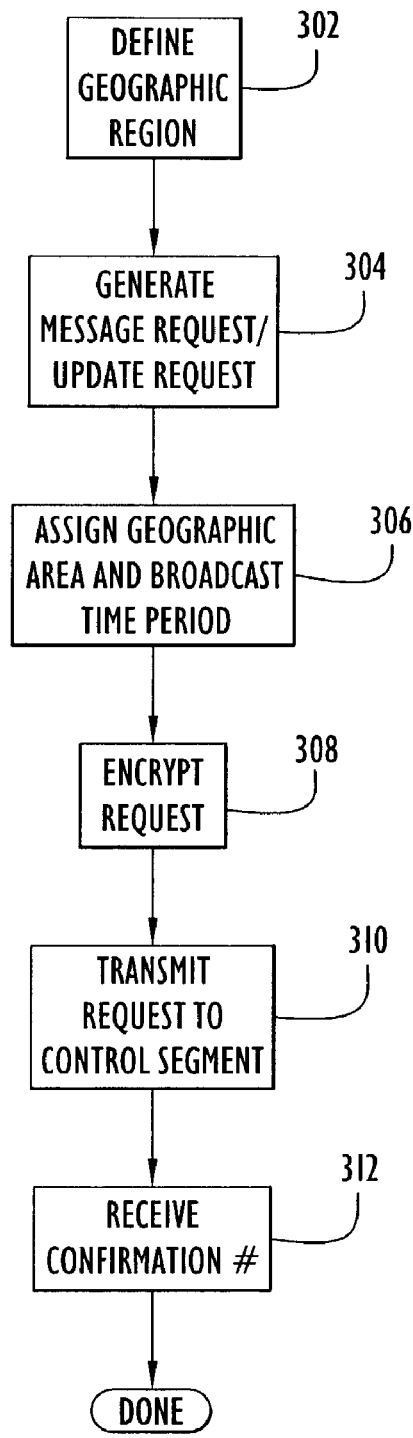
FIG. 3 is a process flow diagram depicting representative activities conducted at an emergency response center (ERC) facility in support of a GPS based emergency message system in accordance with an exemplary embodiment of the present invention.

FIG. 3, is a non-limiting, representative process flow diagram depicting representative activities conducted at an emergency response center (ERC) facility in support of a GPS-enabled emergency message system in accordance with an exemplary embodiment of the present invention. In one non-limiting representative embodiment, an ERC is equipped with a computer workstation (PC) running a GEMS software application. The software application allows an authorized ERC administrator to define geographic regions within the jurisdiction of the ERC (302), generate an emergency message or message update request (304), and to assign to the message one or more associated geographic regions and a broadcast time (306). Once the emergency message request or message update request is assembled, the request is encrypted (308) and transmitted to the GPS control segment (CS) facility (310). In response, the ERC software application receives a request confirmation number that is used in future communications with the CS facility to identify the message (312). By way of a non-limiting example, a previously submitted message request is canceled by submitting an update request, requesting a deletion and identifying the message to be deleted by the confirmation number associated with the message to be deleted. By way of a second non-limiting example, the broadcast time of a previously submitted message is changed by submitting an update request, containing a new requested broadcast time period and identifying the confirmation number of the message for which the new broadcast time is requested. By way of a third non-limiting example, the text of a previously submitted message is changed by submitting an update request containing a new text message and identifying the confirmation number of the message for which the new broadcast time is requested.

When emergency messages must be updated or turned off, ERC's generate update requests and transmit the update requests to the CS. The CS authenticates the update request and uplinks appropriate command messages to the satellite constellation. The receiving satellite vehicles update messages and/or turn off (i.e., delete) messages, as required.

Control Segment Facility (CS)

Figure 4:
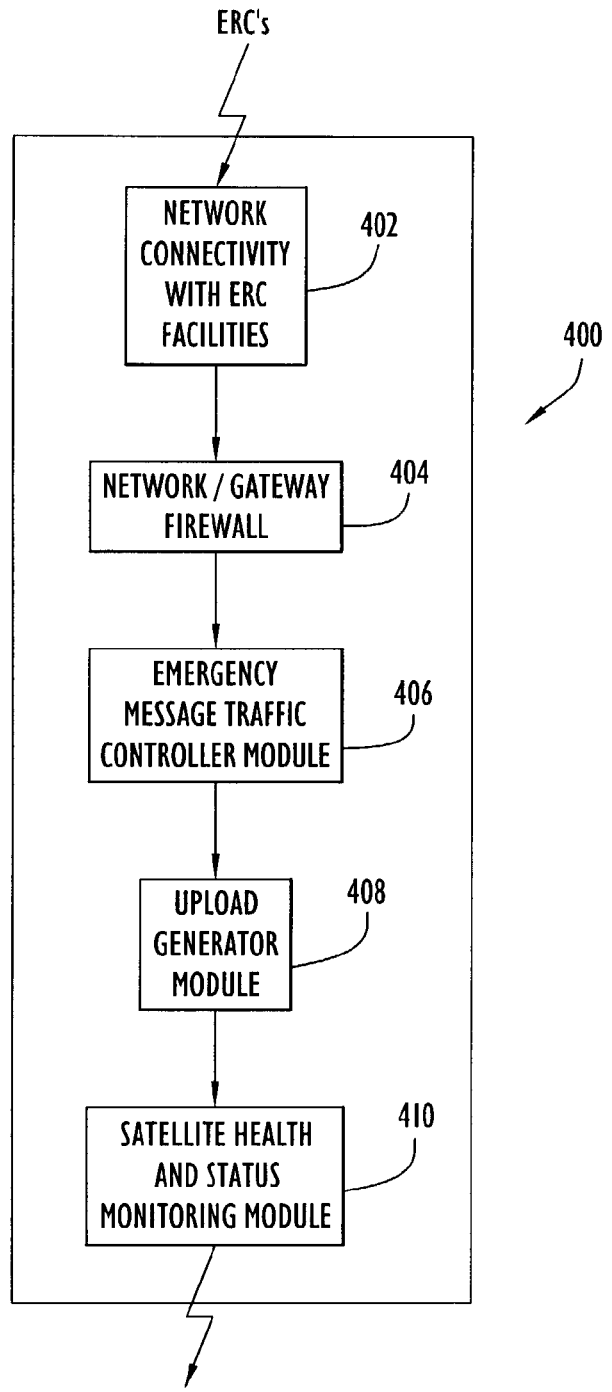
FIG. 4 is a system level diagram of a representative Control Segment (CS) facility in accordance with an exemplary embodiment of the present invention.

The Control Segment (CS) Facility, currently located at Schreiver AFB, CO., controls the GPS satellite constellation and communicates with each satellite on a regular basis. The CS facility functions as a satellite uplink facility for uplinking navigation signal information and emergency broadcast message information to the GPS satellites. To enable the GEMS system, such an existing CS facility requires additional functionality. As depicted in FIG. 4, the key elements of a CS facility 400 are:

1. Network connectivity 402 with ERC's;
2. Network gateway and firewall 404;
3. Emergency message traffic controller 406;
4. Upload generator 408; and
5. Satellite health and status telemetry monitoring 410.

As stated previously, a government decision must be made to determine whether it is permissible to carry GEMS messages on the Internet with appropriate security measures. Alternatively, a private government network can be used or some combination of the two as primary and backup (contingency) networks. In any case, the system requires one or more networks to be connected to the CS for reception of emergency messages from ERC's.

The network or networks (i.e., network connectivity module) 402 that carry ERC messages, interface with the CS LAN via a gateway and firewall (i.e., network gateway security module) 404. The gateway handles reception of messages from the external network(s), and translates received addresses to local CS LAN addresses. The firewall is responsible for identification of possible denial of service attacks. In addition, the firewall contains an INFOSEC module that decrypts and authenticates incoming ERC messages. Any incoming message that fails authentication is discarded, and the firewall notifies appropriate CS operators. Any messages passing authentication are allowed onto the CS LAN and routed to the emergency message traffic controller 406.

The emergency message traffic controller 406 is responsible for insuring that sufficient GPS system resources exist to support the transmission of an ERC message request. The emergency message traffic controller identifies and resolves conflicts associated with message transmission requests that exceed available GPS system resources. Resources include things such as available satellite memory for message storage, available message bandwidth on satellite civilian messaging channels, etc.

It is possible that the number of message requests from ERC's can exceed the capacity of the civilian messaging channel if every message is assigned to be broadcast by every satellite in the constellation. In this case, the emergency message traffic controller can elect to assign specific messages to specific satellite's for specific periods of time. In this way multiple messages can be sent to a given geographic region simultaneously from multiple satellites. It should be noted, however, that this mode of operation can affect the reliability of delivery of messages due to effects such as poor satellite visibility in obstructed areas such as urban canyons.

In embodiments in which ERC assigns each GEMS message a priority indicator, the emergency message traffic controller can also elect to supercede the transmission of lower-priority messages with higher-priority messages in the event that sufficient resources are not available to support all message requests. Message requests of the same priority can be serviced on a first-come-first-served basis or in any other manner that is operationally acceptable to the user community. In one embodiment, an operator at the CS facility screens message requests, and the ERC-assigned priority indicator associated with each message, to assure that ERC operators assign priorities to messages in accordance with prescribed procedures.

In the event that a message transmission request cannot be honored, the emergency message traffic controller sends a message back to the requesting ERC to notify the requesting ERC that transmission resources are not available. Also, in the event that a message transmission request is superceded by a higher priority request, the ERC which initiated the message to be superceded will be notified via a message from the emergency message traffic controller.

In one embodiment, the emergency message traffic controller optimizes GEMS message throughput by scheduling a message for uplink to and transmission by a particular satellite when that satellite is within view of the GMA associated with that message. In this manner, satellite storage capacity is not used unnecessarily and civilian messaging channel bandwidth is not wasted by attempting to transmit a message to a geographic area currently out of view of the satellite.

Once resource conflicts associated with a message have been resolved, the upload generator 408 assigns the message transmission request to a set of satellites responsible for transmitting the message to GEMS user devices. Next, the upload generator 408 formats and schedules the message for upload to the GPS constellation.

The current GPS system performs contacts with the constellation approximately once per hour. A proposed feature of the next generation GPS system (referred to as GPS III) includes a continuous network connectivity between the CS and the GPS constellation. If this feature is implemented, the message upload can be accomplished almost immediately with minimal effect on message latency. Without this feature, the upload can remain queued on the ground, pending the next CS to space segment (SS) contact, which can take many minutes. In either case, the message upload will eventually occur.

Through health and status telemetry monitoring 410, the CS keeps track of the health and status of all satellite's currently transmitting emergency messages and verifies the proper operation of the constellation. Periodic end-to-end testing of the system by each ERC can be performed. As previously described, in one embodiment, test message requests sent by ERC's are assigned a low priority. Furthermore, such test messages are preferably short, and require only a brief transmission duration. In this manner, testing can be performed without disrupting the user community or expending significant resources. Each ERC is responsible for notifying the CS in the event that message transmissions targeted for the ERC's area of jurisdiction are not received as intended, in order to diagnose possible system anomalies.

Figure 5:
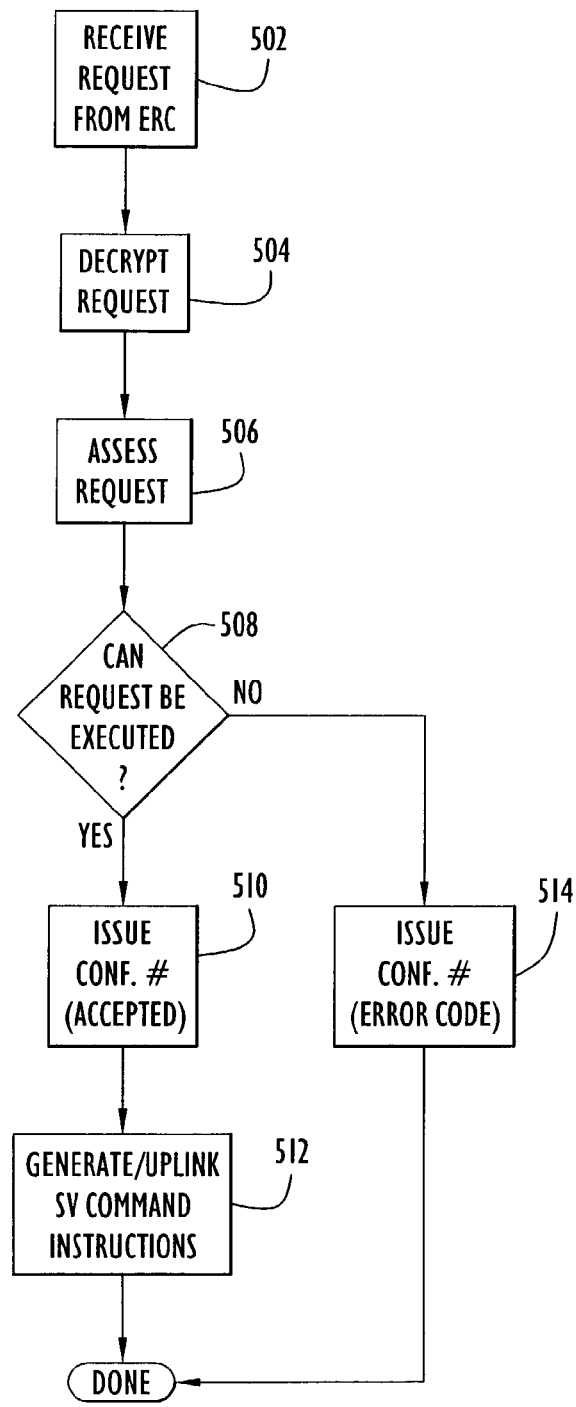
FIG. 5 is a process flow diagram depicting representative activities conducted at a ground-based GPS satellite control segment (CS) facility in support of a GPS-based emergency message system in accordance with an exemplary embodiment of the present invention.

FIG. 5 is a non-limiting, representative process flow diagram depicting representative activities conducted at a GPS satellite ground based control segment (CS) facility in support of a GPS-based emergency message system in accordance with an exemplary embodiment of the present invention. The CS facility receives a request from an ERC facility containing a new message or a message update (502). The CS facility decrypts and authenticates the request (504) and, in order to determine whether the request can be performed, assesses the request to identify potential conflicts with other requests and to identify potential satellite vehicle resource conflicts (506), as previously described. If the request can be performed (508), the CS facility issues a confirmation message to the requesting ERC facility containing a confirmation number indicating that the request was accepted (510) and uplinks a set of command instructions to the satellite constellation that implements the request (512). If the request cannot be performed (508), the CS facility issues a confirmation message to the requesting ERC facility containing a confirmation number, along with an error code indicating why the request was rejected (514).

Space Segment (SS)

Once a message is uploaded to a satellite, the message is propagated, via the GPS cross-links, to the appropriate satellites in the constellation as specified in the upload. The current GPS system does not support this feature; however, several proposed changes currently exist which would enable such operation. One approach, proposed as part of the GPS III system upgrade, provides constant high data rate cross-link connectivity between all GPS satellites. If this approach is implemented, once an emergency message is uplinked to a first satellite from the CS facility, the message can be distributed to the remaining satellites in the constellation in a matter of less than two seconds.

Other embodiments use techniques for distributing messages from the CS facility that require more time. For example, in one GEMS embodiment emergency messages are transmitted from the CS facility to multiple ground stations located around the world. Upon receipt, each ground station retransmits the received messages to satellites within the ground station's respective broadcast range. In another embodiment, the CS facility transmits emergency messages to all satellites within broadcast range of the CS facility and transmits the emergency message to other satellites in the satellite constellation, as they move into broadcast range.

Each satellite maintains a database of uploaded messages which are transmitted to users on the time schedule specified with each message. This is accomplished in software with a modest amount of memory allocated to the message database. The on-board processor encodes the message(s) for forward error correction (FEC) and appends a CRC (cyclic redundancy check) prior to transmission.

Another satellite modification that enhances operation of the GEMS system is increased signal power. Current GPS signal levels are sufficient for user operation outdoors. Operation within buildings is limited or not available. There are current proposals for improvements to the GPS system for significant signal strength increases. Increased signal strength can dramatically improve the probability that indoor users (primarily cell phones with imbedded GEMS GPS receivers) can receive emergency messages. Note that a discussion in the GEMS-enabled user equipment section to follow describes another enhancement that is used to enable GEMS for cell phone users who are in contact with a cell phone base station but not currently receiving GPS due to signal obstruction.

A final satellite modification required for the GEMS system is the ability of the navigation payload to superimpose a civilian emergency messaging channel on top of the existing L1 navigation signal. By way of non-limiting example, one mechanism by which this overlay can be accomplished is a technique known as inter-vote modulation, described in U.S. patent application Ser. No. 09/963,669 entitled, "Methods and Apparatus for Generating a Constant-Envelope Composite Transmission Signal," incorporated by reference is its entirety. Inter-vote modulation has several distinct advantages over other techniques. The inter-vote modulation technique is easily implemented in the satellite navigation payload with virtually no impact on transmission and reception of the GPS navigation signal and without any degradation of GPS system PVT (Position, Velocity, Time) accuracy. Further, this modulation scheme results in a constant-envelope composite transmission signal which permits use of power-efficient saturated high-power amplifiers. Other constant-envelope signal schemes can advantageously be employed with the present invention to transmit emergency messages along with navigation signal, including but not limited to interplex modulation and majority voting. While such modulation schemes are advantageous, it will be understood that the present invention is not limited to constant-envelope modulation schemes or any particular signaling protocol.

The GEMS methods and techniques of the present invention, however, are not limited to any particular signal transmission, interleaving, or multiplexing mechanism or format. Fundamentally, the satellites send transmissions, in some receivable format, which include: navigation signals useful for determining geographic position, emergency messages, and the geographic data that relates to the emergency messages. Any transmission protocol capable of incorporating a GEMS message into the GPS architecture in a manner that does not significantly degrade GPS system PVT (Position, Velocity, Time) accuracy is acceptable. By way of non-limiting example, acceptable protocols include protocols based upon Frequency Division Multiple Access (FDMA), Time Division Multiple Access (TDMA), Code Division Multiple Access (CDMA) or any other existing or future signal transmission technology. Virtually any scheme by which a message is delivered (e.g., interleaved) along with navigation data can be used.

Referring again to the exemplary embodiment, when an emergency message is to be transmitted, the navigation payload reconfigures the L1 waveform generator to enable transmission of the civilian emergency message(s). Message transmissions occur for the duration specified in the upload. Once messages have been turned off, the navigation payload reconfigures the L1 waveform generator to eliminate the existence of the messaging channel. Satellite power is consumed only when needed.

Figure 6:
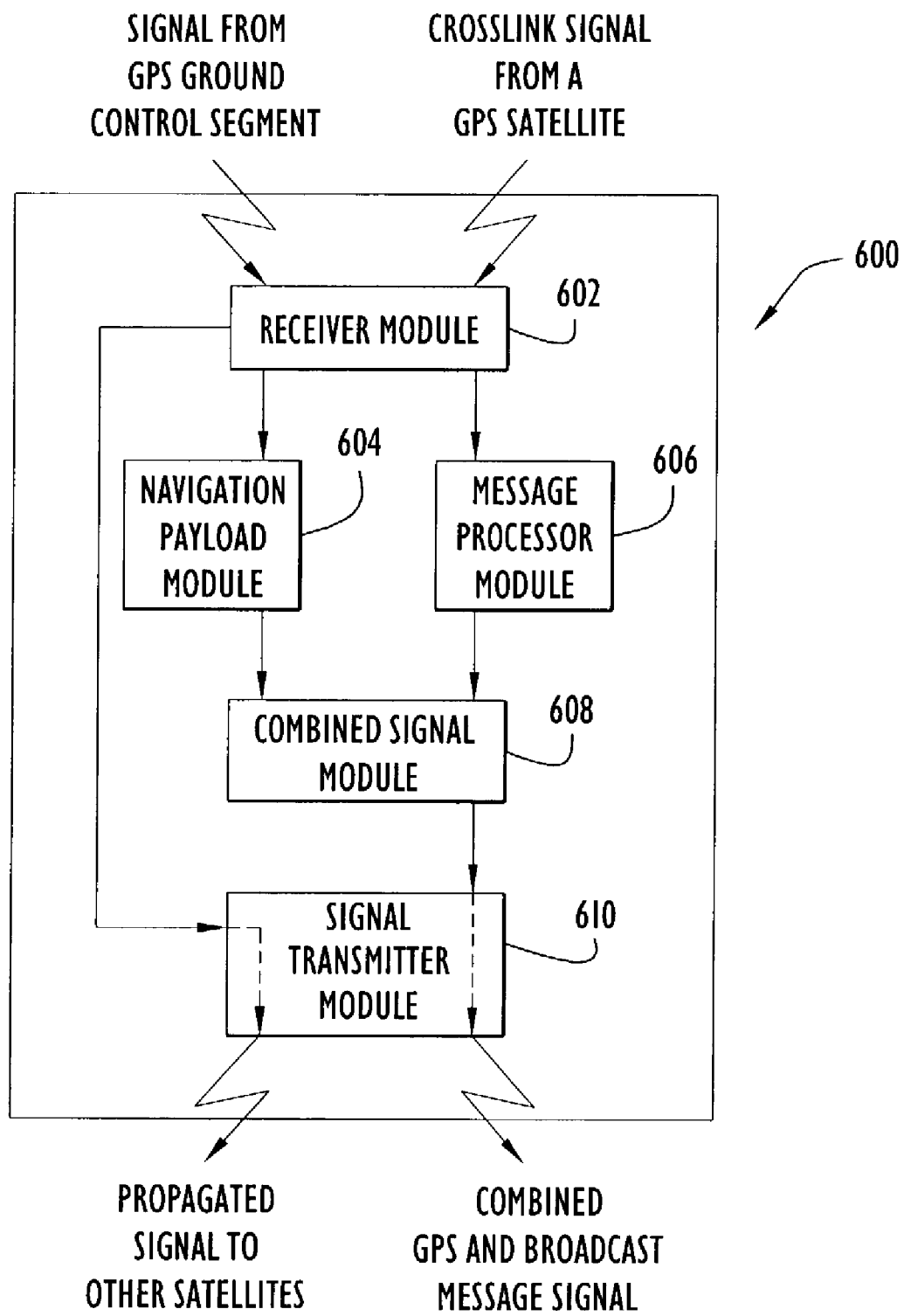
FIG. 6 is a block diagram of a representative emergency message system enabled GPS satellite vehicle in accordance with an exemplary embodiment of the present invention.

FIG. 6 is a non-limiting block diagram of a representative emergency message system enabled GPS satellite vehicle 600 in accordance with an exemplary embodiment of the present invention. A receiver module 602 receives a control signal either directly from the GPS Control Segment (CS) facility via the uplink communications path or indirectly as a propagated message from another GPS satellite via a cross-link communications path, as previously described. If the receiver module 602 decides that the received signal must be propagated to other satellites, as previously described, the received signal is directed to the signal transmitter module 610 for retransmission to other GPS satellites via established cross-link connections. Although the receiver module 602 and the signal transmitter module 610 are shown for convenience as single units which process both earth-oriented and cross-link signals, it will be understood that the satellite cross-link transmit and receive connections can be entirely separate from the transmit and receive connections used to communicate with the CS facility or other ground base stations and can be entirely separate from the broadcast transmission capabilities used to broadcast messages to GEMS enabled user equipment. The receive module demodulates the signal and identifies the signal contents. The receiver module directs GPS navigation related instructions to the Navigation Payload Module 604 and directs GEMS message requests and GEMS message updates to the Message Processor Module 606.

The Message Processor Module 606 maintains a database of scheduled GEMS messages, their scheduled broadcast time periods and their associated geographic multicast addresses. The Navigation Payload Module 604 generates conventional GPS navigation signals compatible with all conventional GPS receivers using conventional L1 waveform generator techniques.

When the scheduled broadcast time for an emergency message arrives, the navigation payload 604 reconfigures the L1 waveform generator to enable transmission of emergency message(s). In FIG. 6, this capability is represented, schematically, as a separate Combined Signal Module 608 that receives input from the Navigation Payload Module 604 and the Message Processor Module 606, and passes a combined message signal containing both the navigation signal and the emergency message signal to the Signal Transmitter 610 for transmission. As previously described, the combined navigation/emergency message signal remains compatible with all conventional GPS receivers.

Combined message transmissions, via the Combined Signal Module 608, occur for the duration specified in the emergency message broadcast time period. Once the time period for the emergency message expires, the navigation payload reconfigures the L1 waveform generator to eliminate the existence of the messaging channel. In this manner, satellite power is consumed only when needed.

During the broadcast time period of an emergency message, the navigation payload superimposes a civilian emergency messaging channel on top of the existing L1 navigation signal. The civilian emergency messaging channel contains the emergency message scheduled for that specific time period. One non-limiting, representative technique that can be used to superimpose a civilian emergency messaging channel on top of the existing L1 navigation signal is a technique known as inter-vote modulation, as previously described.

Figure 7:
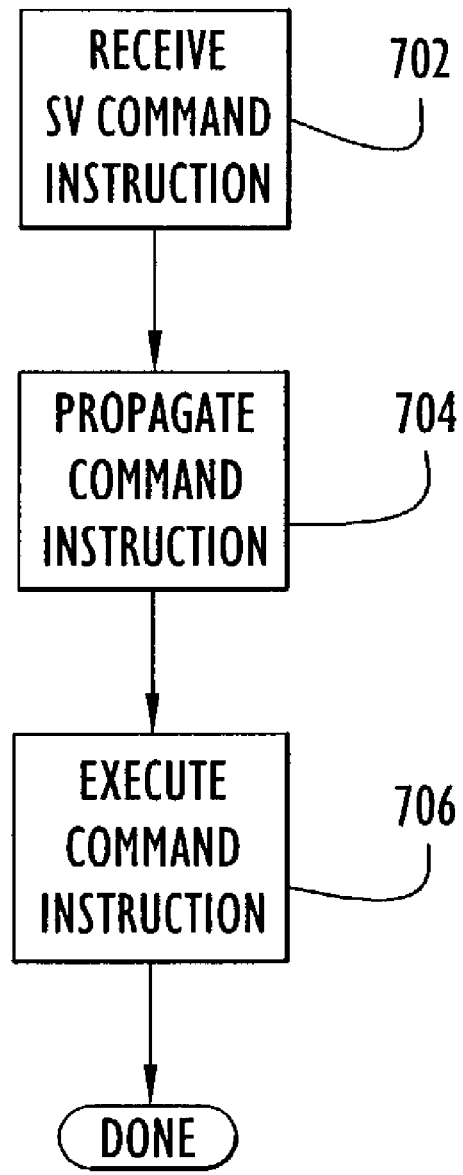
FIG. 7 is a process flow diagram depicting representative activities performed within a GPS space segment (SS) (i.e., satellite vehicle) in receiving messages from a CS facility in accordance with an exemplary embodiment of the present invention.

FIG. 7 is a non-limiting, representative process flow diagram depicting activities performed within a GPS space segment (SS) (i.e., satellite vehicle) in receiving messages from a control segment facility in accordance with an exemplary embodiment of the present invention. First, an uplinked message/update request is received from the ground control facility or from a propagating neighboring satellite (702). Next, the receiving GPS satellite retransmits the message/update request to other orbiting satellites via communication cross-links with its neighboring satellites (704). Techniques to assure that a request is efficiently propagated across the respective orbiting satellites can vary. For example, in one non-limiting embodiment, a unique identifier is associated with each uploaded message, thereby providing the satellite a basis for assuring that each unique message is retransmitted no more than a single time. Once the satellite determines that the retransmission needs of a request are satisfied, the satellite executes the message/update request (706) by adding a message to a stored repository of scheduled messages, deleting a previously stored message, updating a previously stored message, modifying the scheduled transmission period associated with a previously stored message and/or executing other command instructions received from the CS facility.

Figure 8:
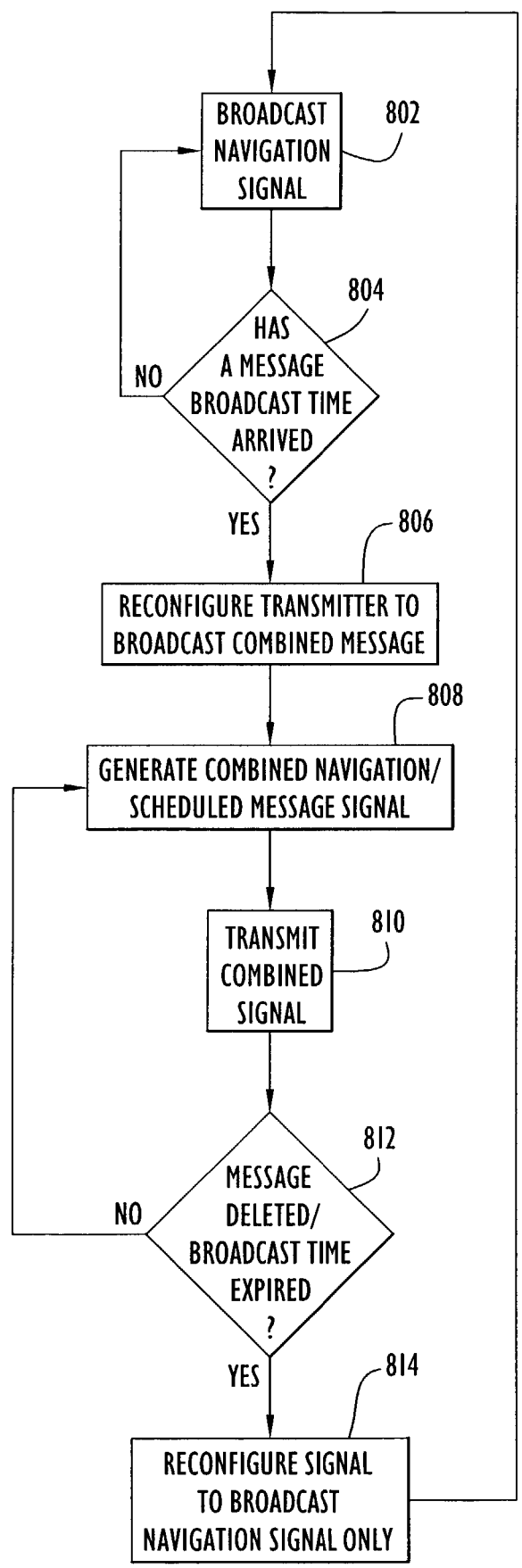
FIG. 8 is a process flow diagram depicting representative activities conducted within an emergency message system enabled GPS satellite vehicle to broadcast navigation signals containing an emergency message in accordance with an exemplary embodiment of the present invention.

FIG. 8 is a process flow diagram depicting representative activities conducted within an emergency message system enabled GPS satellite vehicle to broadcast navigation signals containing an emergency message in accordance with an exemplary embodiment of the present invention. During periods in which no emergency messages are scheduled, the GPS satellite vehicle broadcasts an ordinary L1 navigation signal (802). Upon arrival of a time period during which an emergency message is scheduled for transmission (804), the navigation payload reconfigures the L1 waveform generator to enable transmission of a civilian emergency message (806). The scheduled message is retrieved from the message processor module and a combined navigation/emergency message signal is generated (808), using the techniques described above. The combined message is then transmitted (810).

If the message is deleted via an update request, as previously discussed, or the broadcast time for a message expires (812), transmission of a combined signal ceases and the expired emergency message is deleted from storage in the satellite vehicle GEMS message processor module. The navigation payload then reconfigures the L1 waveform generator to transmit conventional L1 signals (814). Otherwise, if the message is not deleted and the broadcast time for the message has not expired (812), processing continues at operation 808, and transmission of the combined navigation/emergency message signal continues.

GEMS Enabled User Equipment

GPS enabled Emergency Messaging System (GEMS) user equipment can be any device capable of receiving a signal in which non-navigation information is interleaved with a GPS navigation signal. GEMS enabled user equipment can be virtually any communication device, mobile or stationary, equipped with or supported by the appropriate RF/1F hardware for satellite communications, including but not limited to: any type of computer; a handheld or body-mounted radio; any type of mobile or wireless telephone (e.g., analog cellular, digital cellular, PCS or satellite-based); a pager, beeper or PDA device; wrist watch or any other personal time-keeping device; a radio carried on, built into or embedded in a ground-based or airborne vehicle; any portable electronic device equipped with wireless reception/transmission capabilities, including multimedia terminals capable of receiving/transmitting audio, video and/or data information; and any device mounted in a fixed location with transmission/reception capabilities.

One non-limiting, representative GEMS enabled user equipment includes a GPS receiver equipped with a demodulator, capable of receiving messages broadcast on a civilian emergency messaging channel, superimposed over the conventional L1 signal. In addition to the receiver, the user equipment has an imbedded processor. Functions performed by the GPS receiver in conjunction with the imbedded processor, include:

1. Demodulation of the civilian emergency messaging channel;
2. Forward error correction (FEC) on received messages;
3. Geographic address screening; and
4. Generation of alert and message display.

The first operation performed within the user equipment is the reception and demodulation of the civilian emergency messaging channel by the GEMS-compatible GPS receiver. The demodulated data then passes through a forward error correction (FEC) function to correct transmission bit errors and a final cyclic redundancy check (CRC) check is performed to verify that the message was properly received and decoded. Next, the geographic multicast address (GMA) attached to the message is examined. A calculation is performed to determine if the current user position (as determined by the GPS receiver) falls within the area defined in the GMA.

The technique used to determine whether the latitude/longitude location of the user equipment is within the geographic region defined by the GMA varies depending upon the format of the GMA address. For example, if the GMA format defines a circle of radius R with a center at a particular latitude and longitude (Lat/Lon), the user equipment can calculate the distance from user equipment to the center of the GMA defined region. If the distance calculated is less that R, then the user equipment is within the geographic region defined by the GMA. If the GMA format defines a rectangle of length L and height H with from a corner-point at a particular Lat/Lon, the user equipment can convert its own lat/lon position to L and H component values relative to the GMA corner-point. If either the calculated L and H components is greater in magnitude or different in sign than the L and H values provided in the GMA, the user equipment is located outside the geographic region defined by the GMA. If both the L and H components calculated for the user equipment are less in magnitude and the same in sign as the L and H values provided in the GMA, the user equipment is located within the region defined by the GMA.

If, using techniques similar to those described above, a GEMS enabled user equipment receives a GEMS enabled signal and determines itself not to be within the broadcast area defined by the GMA, the message is discarded and no further action is taken. However, if the GEMS-enabled user equipment determines itself to be within the broadcast area defined by the GMA, the message is passed to the alert/message interface module. In one embodiment, the alert/message interface module performs further message screening based upon user configurable parameters. For example, all messages with an assigned message priority below a user configurable threshold, can be ignored. In this manner, a user is provided the ability to configure GEMS-enabled user equipment to ignore messages based upon a user defined criteria, such as assigned message priority. Upon passing this level of screening, the user is notified of the message.

The user equipment preferably provides sufficient memory for receiving and displaying multiple GEMS messages. The number of messages that can be received and stored in a GEMS user equipment is limited only by the physical memory constraints of the individual GEMS user equipment. In one GEMS embodiment, to facilitate the design of GEMS-compatible user equipment, a maximum message length and a maximum number of valid messages per GMA per a defined period of time are defined. Such constraints assure that a user has a reasonable amount of time to review a message before the message is lost or over-written by a subsequent GEMS message.

Figure 9:
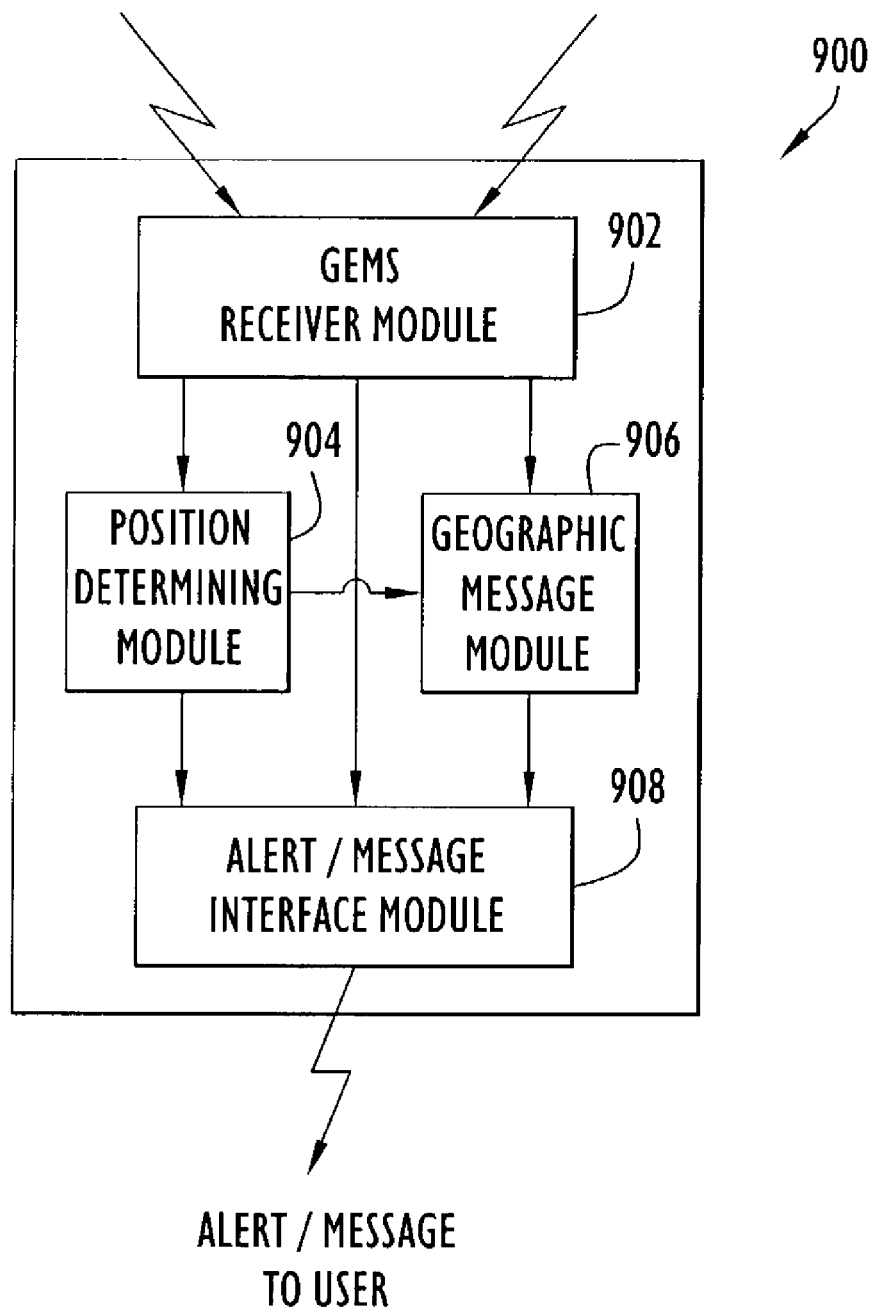
FIG. 9 is a block diagram of a representative emergency message system enabled receiver capable of receiving navigation signals containing an emergency message in accordance with an exemplary embodiment of the present invention.

FIG. 9 is a block diagram of a non-limiting, representative GEMS enabled receiver 900 capable of receiving combined GPS navigation signals containing an emergency message system message in accordance with an exemplary embodiment of the present invention. The GEMS receiver represented in FIG. 9 can be embedded and/or integrated with any electronic device, as previously described. A GEMS-enabled receiver is able to extract the emergency message that is included within the GEMS combined navigation/message signal. To receive a GEMS emergency message, GEMS enabled user equipment need only receive a single combined GEMS/GPS signal containing a EMS message. Despite overlaying the GEMS emergency message over the original GPS navigation signal, conventional GPS receivers are able to receive the GEMS navigation/emergency message combined signal without any degradation of GPS system PVT (Position, Velocity, Time) accuracy. Such conventional GPS receivers, however, are not capable of extracting the emergency message component.

A GEMS enabled receiver device 900 has a GEMS Receiver Module 902 capable of demodulating both conventional GPS signals and GEMS combined navigation/emergency message signals. When a combined navigation/emergency message is received, from either a GPS satellite or a ground based transmitter, the GEMS receiver module 902 directs GPS navigation related information to the Position Determining Module 904, directs geographic multicast address information to the Geographic Message Module 906 and passes the emergency message content to the Alert/Message Interface Module 908.

Figure 10:
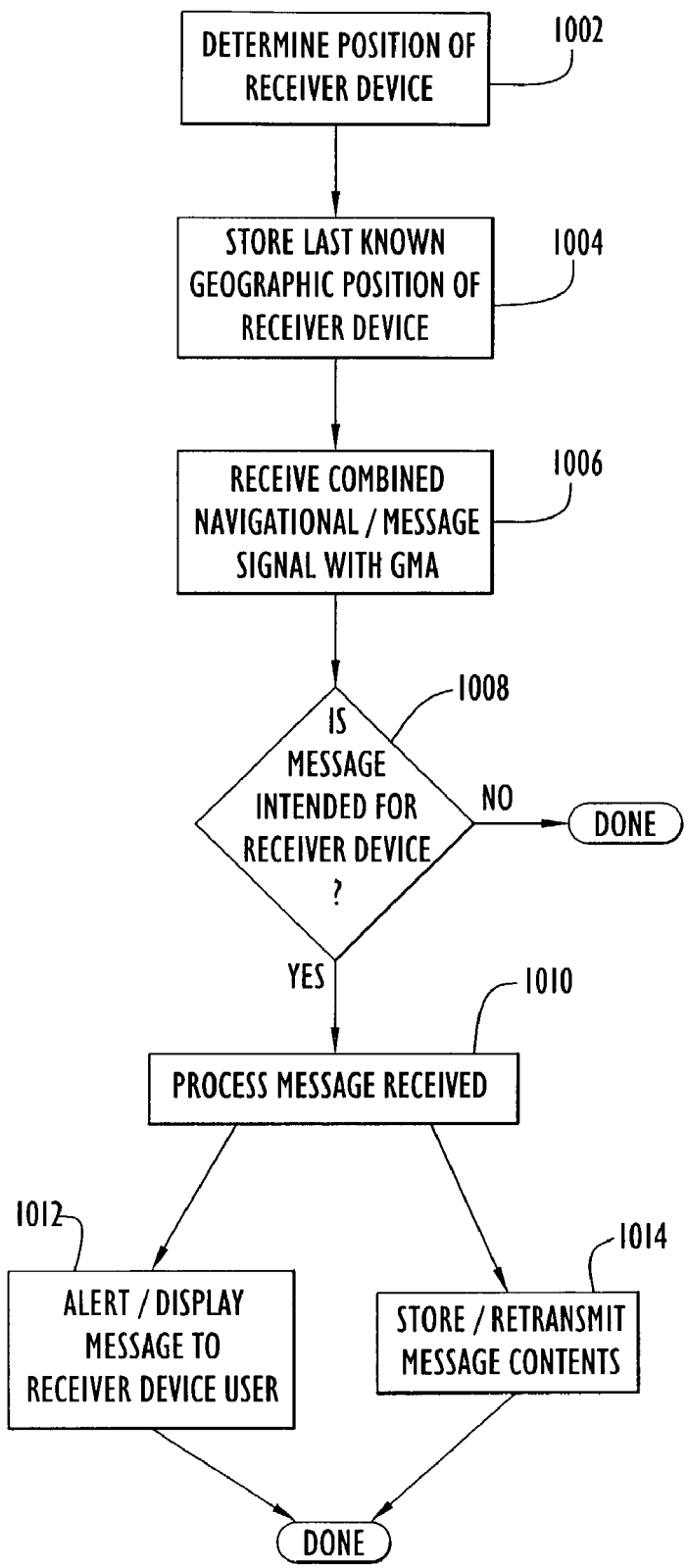
FIG. 10 is a process flow diagram depicting representative activities conducted within a representative emergency message system enabled receiver to receive a navigation signal containing an emergency message in accordance with an exemplary embodiment of the present invention.

FIG. 10 is a process flow diagram depicting representative activities conducted within a representative GEMS-enabled receiver to receive a navigation signal containing an emergency message in accordance with an exemplary embodiment of the present invention. The position-determining module can use any of a number of mechanisms to determine (1002) and store (1004), the last known geographic location of the GEMS enabled receiver. For example, if a sufficient number of GPS navigation signals are received, from either GPS satellites, ground based transmitters or a combination of the two sources, the position determining module 904 (FIG. 9) attempts to determine the position of the GEMS enabled receiver using trilateration techniques. Alternatively, the position determining module can store a previously-determined geographic location or a geographic location input by a user or read from a local emitter, such as a cell phone base station or kiosk.

Upon detecting a combined navigation/message signal (1006), the GEMS receiver module 902 (FIG. 9) demodulates the civilian emergency messaging channel and performs forward error correction (FEC) on the received message. Next, the geographic message module 906 (FIG. 9) executes a geographic address screening process that assesses the geographic multicast address (GMA) received with the combined GEMS signal and determines, based upon a last known geographic location information provided by the position determining module 904 (FIG. 9), whether the GEMS device is within the geographic area to which the emergency message is addressed (1008). If the GEMS device is not within the geographic area to which the emergency message is addressed, the message is deleted. However, if the GEMS device is within the geographic area to which the emergency message is addressed, as previously described, the received message is processed 1010. In processing the received message, if the GEMS-enabled device is an end-user personal electronic device, the message is optionally screened based upon a variety of user configurable filters, such as assigned message priority, as previously described. If the received message passes the optional filtering process (if any), the user is alerted that a message has been received and/or the emergency message is displayed (1012). However, if the GEMS enabled device is a transmitter capable of retransmitting the GEMS emergency message, the message is not presented via a user interface, but is stored for rebroadcast (1014).

Referring again to FIG. 9, depending upon the nature and/or design of the GEMS enabled user equipment, the distribution of operations described in relation to the GEMS receiver module 902, the position determining module 904 and the geographic message module 906 can vary. For example, in an embodiment in which the GEMS-enabled user equipment is a device such as a laptop computer and the objective is to produce an inexpensive GEMS enabled device, the majority of the processing performed by the position determining module 904 and geographic message module 906 can be implemented in software executed by the laptop computer central processor with the conventional computer display, keyboard, speaker(s) and associated control capabilities with additional GEMS software controls added, as necessary, serving as the alert/message interface module 908. In such an embodiment the GEMS receiver module 902 need only detect and receive the physical signal. Further demodulation and processing can be performed using the general processor of the laptop computer. In one variation of such an embodiment, optional secondary filters based upon configurable user parameters, such as message priority, are applied within the alert/message interface module 908, if the user equipment is so configured, as previously described. Messages that successfully pass geographic filtering, and optional user configurable filters, are presented to the user.

In an alternative embodiment, in which the GEMS enabled user equipment is a hand-held GPS device, or a consumer electronic device into which a GEMS/GPS receiver chipset has been integrated, the operations performed by the GEMS receiver module 902, the position determining module 904 and the geographic message module 906 can be performed within the GEMS/GPS receiver chipset. Upon receiving and processing an emergency message, any messages addressed to the geographic region defined by the GMA are passed by the GEMS/GPS receiver chipset to a device specific alert/message interface module 908 for presentation to the user. In one variation of such an alternate embodiment, optional secondary filters based upon configurable user parameters, such as message priority, are applied within the alert/message interface module 908, if the user equipment is so configured, as previously described. Messages that successfully pass geographic filtering, and optional user-configurable filters, are presented to the user.

In another alternative embodiment, the GEMS enabled user equipment is a hand-held communications device or other consumer electronic device into which a GEMS receiver chipset without GPS capability has been integrated. The position determining module in such an embodiment is not needed, since the device receives a geographic position from a secondary source, such as a cellular base-station, repeater, fixed position transmitter, or via manual user input. In yet another alternative embodiment, the GEMS-enabled user equipment has a GEMS receiver chipset with GPS capability, yet is also capable of receiving geographic position information from a secondary source of geographic position information, if needed.

In both exemplary embodiments, a geographic position received from a secondary source, such as those exemplary sources listed above, need not be the precise location of the communications device, so long as the geographic position received accurately describes the approximate location of the GEMS-enabled user equipment. For example, a secondary source of geographic position information, such as a cellular base-station, repeater, fixed position transmitter can be the geographic position of the respective secondary source's transmitter. Also, by way of example, a manual user input can be a "best guess" at the lat/lon geographic position, or a logical geographic position, such as a country, state, city, or zip-code, that can be translated by the communications device into a physical geographic position or geographic area. When determining whether the GEMS-enabled user equipment is within the geographic area in which reception of the broadcast message is intended, the user equipment can be configured to expand its approximate geographic location by the accuracy of the source from which the approximate geographic position was received. In the case of a cell base station, for example, accuracy can be assumed to be one-half the diameter of a typical cell. By way of a second example, in the case of a user input geographic position, accuracy can be determined by the resolution with which the geographic position is entered (e.g., degrees, minutes, seconds).

If position information is received by a GEMS-enabled user equipment via a secondary source, such as a cellular base-station, repeater, fixed position transmitter, or similar device, the position information is preferably included as a data broadcast on a regular basis to a limited geographic area. For example, with respect to a cellular communications device, GPS position information can be included by a base station as a part of the ordinary exchange of data in support of call set-up processing, cell-to-cell handoff processing, or as part of a regularly emitted heartbeat signal.

If geographic position information is entered manually, the geographic position is preferably entered as GPS compatible lat/lon coordinates, but could be entered using an alternate coordinate system, such as Universal Transverse Mercator (UTM) coordinates or logical geographic position, so long as the device is capable of translating the entered coordinates into GPS compatible lat/lon coordinates.

For example, in one non-limiting embodiment, in which a logical geographic position (i.e., a country, state, city, or zip-code, etc., as described above) is input by a user, the GEMS-enabled user equipment can use a translation table to translate the logical geographic position into one or more GPS compatible lat/lon coordinates or a defined geographic area that is used by the geographic message module to assess whether the GEMS user equipment is located within the geographic area defined by the GMA associated with a received message. In one embodiment, such translation tables can be downloaded from the Internet for a general geographic area and loaded into the GEMS enabled device through an electronic data interface, thereby reducing the amount of memory required to store the translation tables needed to support operations. In another embodiment, such translation tables can be preloaded and permanently stored in device memory, preferably in compressed format to conserve hardware requirements.

As described in relation to FIG. 10 at operation 1014, a GEMS enabled receiver is not required to be an end-user device that displays messages directly to users. For example, a cell phone base station can also be a GEMS-enabled device. Upon determining that the GEMS-enabled cellular phone base station is within the geographic area to which an emergency message is addressed, the GEMS-enabled base station can store the emergency message and proceed to periodically rebroadcast the emergency message to all cellular phones within the cell serviced by the base station. In this manner, the emergency messages can be received by non-GEMS-enabled devices in locations (such as within buildings) where GPS signals are not strong enough to be received.

Alternatively, ground-based transmitters, such as the cell base station described above, can be used as a secondary source of EMS signals in addition to those transmitted directly by a GPS satellite. For example, some GEMS-enabled cell phone users may be located indoors, out of range of the normal GPS signal but within range of the local cell phone base station. In the event of a GEMS emergency message, the local cell phone service provider can periodically send a special broadcast data message to all cell phones in the area. In the event that a GEMS-enabled cell phone receives the message, it will determine if the GPS signal is available. If the GPS signal is available, no special action is taken (the normal GEMS emergency message system will operate normally). If the special message is received from the cell phone base station but the GPS signal is not available, the cell phone can generate an alert with instructions such as "Emergency! Exit the building and await further instructions". The user would then exit the building, start receiving the GPS signals and the normal operation of GEMS would take over.

In one embodiment of GEMS enabled user equipment, if the same GEMS emergency message is received from multiple sources, such as directly from multiple GPS satellites or a combination of GPS satellites and a cell phone base station (for example), the user device will identify receipt of a duplicate message and store/display only a single copy of the message.

A GEMS-enabled receiver device can be configured to display emergency messages even if GEMS enabled receiver cannot determine its current geographic position. In such a situation, the GEMS receiver can alert the user to all emergency messages received without filtering the incoming messages based upon the geographic multicast address included within the respective messages. Configuring the GEMS receiver device in such a manner allows the device to be used as a GEMS emergency message "scanner" capable of processing all physically received GEMS emergency messages, regardless of the designated target location. Furthermore, a GEMS enabled receiver device can be configured to selectively process emergency messages directed to one or more specific geographic areas, selected, for example, by zip-code or predefined GMA, thereby serving as a selective GEMS emergency message scanner.

In another embodiment of GEMS-enabled user equipment, in addition to geographic position data, the GEMS emergency message includes a logical identifier that is used to identify a group of individuals, such as paramedics, doctors, nurses, firefighters, policeman, coastguard, park-police, smoke-jumpers, military and/or national guard personnel, winter road-crews, etc., of messages tailored to their professional community so as to more quickly respond to emergency calls to readiness/action. Given the precision with which GEMS messages can be geographically directed, it can be expected that in emergency situations GEMS may be used to issue a large number of messages to any GMA. Logical identifiers, therefore, allow GEMS enabled devices a further level of logical filtering by which a user can avoid being flooded with messages unrelated to their information needs.

Having described preferred embodiments of a new and improved emergency messaging system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of receiving a message broadcast via satellite communications, comprising:
   (a) receiving, at a receiver, transmissions from global positioning system (GPS) satellites, wherein the transmissions from the GPS satellites include: a navigation signal useful for determining a geographic position of the receiver; and a broadcast message including information relating to a geographic area in which reception of the broadcast message is intended;
   (b) determining a geographic position of the receiver;
   (c) determining whether the geographic position of the receiver is within the geographic area in which reception of the broadcast message is intended; and
   (d) supplying the broadcast message to a user interface for generating an output in response to the geographic position of the receiver being within the geographic area in which reception of the broadcast message is intended.

2. The method of claim 1, wherein transmissions of the navigation signal and the broadcast message are multiplexed.

3. The method of claim 1, wherein the navigation signal and the broadcast message are transmitted via code division multiple access (CDMA) multiplexing.

4. The method of claim 1, wherein the navigation signal and the broadcast message are transmitted via a constant-envelope composite signal.

5. The method of claim 4, wherein the navigation signal and the broadcast signal are transmitted via inter-vote modulation.

6. The method of claim 1, wherein the broadcast message is an emergency broadcast message.

7. The method of claim 6, wherein the emergency broadcast message includes information describing a type of emergency that exists and information explaining how to respond to the emergency.

8. The method of claim 6, wherein the emergency broadcast message contains emergency instructions and guidance tailored for users within the geographic area in which reception of the emergency broadcast message is intended.

9. The method of claim 1, wherein the transmissions are broadcast from a Global Positioning System (GPS) satellite.

10. The method of claim 1, wherein (b) includes receiving navigation signals from a plurality of satellites and calculating the geographic position of the receiver based upon the navigation signals.

11. The method of claim 1, wherein (b) includes determining the geographic position of the receiver from a source other than navigation signals transmitted by satellites.

12. The method of claim 1, wherein the output includes at least one of: an aural signal; a visually displayed message; and a retransmission of the broadcast message.

13. The method of claim 1, wherein the broadcast message further includes an identifier that identifies a category of individuals for which the broadcast message is intended.

14. The method of claim 1, wherein the broadcast message further includes a priority indicator that identifies a priority level assigned to the broadcast message.

15. The method of claim 14, wherein the receiver is configurable to receive messages above or below a specified priority level.

16. The method of claim 1, wherein the geographic area in which reception of the broadcast message is intended is specified using at least one geographic location.

17. The method of claim 1, wherein the broadcast message includes a plurality of messages respectively intended for reception in a plurality of geographic areas.

18. The method of claim 17, wherein at least some of the plurality of geographic areas overlap.

19. The method of claim 17, wherein at least one of the plurality of geographic areas lies within another of the plurality of geographic areas.

20. A communication device for receiving a message broadcast via satellite communications, comprising:
   a receiver for receiving transmissions from global positioning system (GPS) satellites, wherein the transmissions from the GPS satellites include: a navigation signal useful for determining a geographic position of the receiver; and a broadcast message including information relating to a geographic area in which reception of the broadcast message is intended;
   a position-determining processor coupled to said receiver and configured to determine a geographic position of the receiver;
   a message processor coupled to said receiver and to said position-determining processor and configured to determine whether the geographic position of the receiver is within the geographic area in which reception of the broadcast message is intended; and
   a user interface for generating an output indicative of the broadcast message in response to said message processor determining the geographic position of the receiver to be within the geographic area in which reception of the broadcast message is intended.

21. The communication device of claim 20, wherein said receiver receives the navigation signal and the broadcast message as a multiplexed transmission.

22. The communication device of claim 20, wherein said receiver receives the navigation signal and the broadcast message as code division multiple access (CDMA) signals.

23. The communication device of claim 20, wherein said receiver receives a constant-envelope composite signal comprising the navigation signal and the broadcast message.

24. The communication device of claim 23, wherein said receiver receives an inter-vote modulated signal comprising the navigation signal and the broadcast signal.

25. The communication device of claim 20, wherein the broadcast message received by said receiver is an emergency broadcast message.

26. The communication device of claim 25, wherein the emergency broadcast message includes information describing a type of emergency that exists and information explaining how to respond to the emergency.

27. The communication device of claim 25, wherein the emergency broadcast message received by said receiver contains emergency information tailored for users within the geographic area in which reception of the emergency broadcast message is intended.

28. The communication device of claim 20, wherein said receiver receives transmissions from a Global Positioning System (GPS) satellite.

29. The communication device of claim 20, wherein said receiver receives transmissions containing navigation signals from a plurality of satellites, and wherein said position-determining processor calculates the geographic position of the communication device based upon the navigation signals.

30. The communication device of claim 20, said position-determining processor determining the geographic position of the communication device from information other than navigation signals transmitted by satellites.

31. The communication device of claim 20, wherein said user interface includes at least one of a speaker for generating an aural signal and a display for visually displaying a message.

32. The communication device of claim 20, wherein the broadcast message received by said receiver includes an identifier that identifies a category of individuals for which the broadcast message is intended.

33. The communication device of claim 20, wherein the broadcast message received by said receiver includes a priority indicator that identifies a priority level assigned to the broadcast message.

34. The communication device of claim 33, wherein said receiver is configurable to receive messages above or below a specified priority level.

35. The communication device of claim 20, wherein the broadcast message received by said receiver specifies the geographic area in which reception of the broadcast message is intended using at least one geographic location.

36. The communication device of claim 20, wherein the broadcast message received by said receiver includes a plurality of messages respectively intended for reception in a plurality of geographic areas.

37. The communication device of claim 36, wherein at least some of the plurality of geographic areas overlap.

38. The communication device of claim 36, wherein at least one of the plurality of geographic areas lies within another of the plurality of geographic areas.

* * * * *